United States Patent [19]

Sacks

[11] 3,732,370

[45] May 8, 1973

[54] EQUALIZER UTILIZING A COMB OF SPECTRAL FREQUENCIES AS THE TEST SIGNAL

[75] Inventor: Jack Sacks, Palos Verdes Estates, Calif.

[73] Assignee: United Recording Electronic Industries, Hollywood, Calif.

[22] Filed: Feb. 24, 1971

[21] Appl. No.: 118,454

[52] U.S. Cl. .....................................179/1 D, 333/28

[51] Int. Cl. ..................................................H03j 5/24

[58] Field of Search ......................179/1 D, 1 F, 1 FS; 333/76, 28 T; 325/12; 181/0.5 AP, 0.5 R

[56] References Cited

UNITED STATES PATENTS

| | | | |
|---|---|---|---|
| 3,624,298 | 11/1971 | Davis | 179/1 D |
| 3,256,391 | 6/1966 | Boner | 179/1 FS |

OTHER PUBLICATIONS

Augspurger, Tailor Your Loudspeaker to Your Room, Electronics World, 1/61, p. 38–40, 124.

*Primary Examiner*—Kathleen H. Claffy
*Assistant Examiner*—Jon Bradford Leaheey
*Attorney*—Gerald Singer

[57] ABSTRACT

A system and method is described for electronically equalizing the composite transfer function of a loud speaker system and room which receives the sound generated by the speaker system. A test signal source is broadcast into a room through the normal loud speaker amplifier system. A substantially flat microphone and preamplifier is used to detect the system and feed the detected audio signal through a bank of audio filters substantially covering the low, middle, and high range audio spectrum from approximately 30 cycles to 20 kilohertz (KHZ) by using approximately three narrow band peaking filters per octave. The power in the bandwidth of each filter is detected and measured against a known reference and the individual gain of each of the filters is adjusted to obtain a substantially flat acoustic response. The normal conventional input sound source, be it a tuner or tape deck, is then fed through the adjusted bank of narrow band filters directly into the audio sound system for broadcast into the room in the conventional manner.

14 Claims, 13 Drawing Figures

Jack Sacks,
INVENTOR.
BY.
AGENT.

EQUALIZER UTILIZING A COMB OF SPECTRAL FREQUENCIES AS THE TEST SIGNAL

BACKGROUND OF THE INVENTION

In the art of high fidelity sound generating systems it has long been recognized that the power amplifier should have a substantially flat response over the desired operating audio spectrum. High grade amplifiers are available commercially which satisfy this criteria and are generally known to have sufficient power and flatness over the spectrum to satisfy the most discriminating requirements. The weakest link in the sound generating system is the transducer system or speaker system which radiates the audio energy into the room environment. In a high fidelity sound transducing system, it is not uncommon for the speaker systems to cost more than the amplifier and related electronics.

The art is just beginning to recognize that unless the sound system is equalized to the room environment that standing waves due to room effects, such as resonant conditions or reflections, will unduly amplify or suppress the sound generated by the source in a manner not anticipated by the designer or user.

Prior art systems have attempted to solve this problem by using a noise generator which radiated a band of white (or "pink") noise into the room; a microphone, detecting the noise, would feed the detected signal through a band of notching filters to a sound level meter. These systems used some form of spectrum analyzer to give a fast Fourier transform display in order for the operator to observe a complete plot of frequency versus amplitude over the entire audio spectrum. The operator would then adjust each of the notching filters to obtain a flat response over the whole spectrum as observed on the panoramic display device. The band of noise detected is therefore a function of the responses of all the notching filters and includes the tails of all notching filters in the system. In a practical system it is necessary to adjust and readjust the individual filters many times in order to balance the system because of the interaction of tail responses of the filters in the system. The end result is that trained technicians were required to successfully equalize a room and speaker system by these prior art methods, which were also time consuming and costly in terms of labor.

SUMMARY OF THE INVENTION

In the present invention there is disclosed a means for generating a signal source comprising a comb of spectral frequencies in the audio range. The form of the signal source may be a saw tooth wave or a square wave; however in the preferred embodiment a square wave is used since the positive going pulses and the negative going pulses comprising the square wave more fully utilize the complete dynamic range of the amplifier, as opposed to the saw tooth wave which by virtue of asymmetry, uses less dynamic range of the amplifier. The form of the wave used is independent of the disclosed invention. The power output of the signal source is controllable and is fed to the power amplifer and speaker system for broadcasting the comb of frequencies into the room environment surrounding the speaker. The comb of spectral frequencies is detected preferably by substantially flat microphone and preamplifier which feeds the detected signal into a bank of contiguous narrow band filters which substantially cover the band of spectral frequencies being generated by the test signal source. In the preferred embodiment, 24 three-octave filters have been used which cover the range from 30 hertz to 15 KHZ. The spectral power in the bandwidth of each of the filters is measured and compared against a known reference. The spectral power response of each of the peaking filters is adjusted when comparing the power output of the filter against the reference and in this manner a flat response is obtained over the complete spectrum which takes into account the transfer functions of both the loud speaker arrangement and the room environment.

In the present invention there are described two embodiments for measuring the spectral power in the bandwidth of each of the filters and both of these embodiments will be described as the description of the invention progresses.

Reference now being made to the accompanying drawings wherein.

Figure 6:
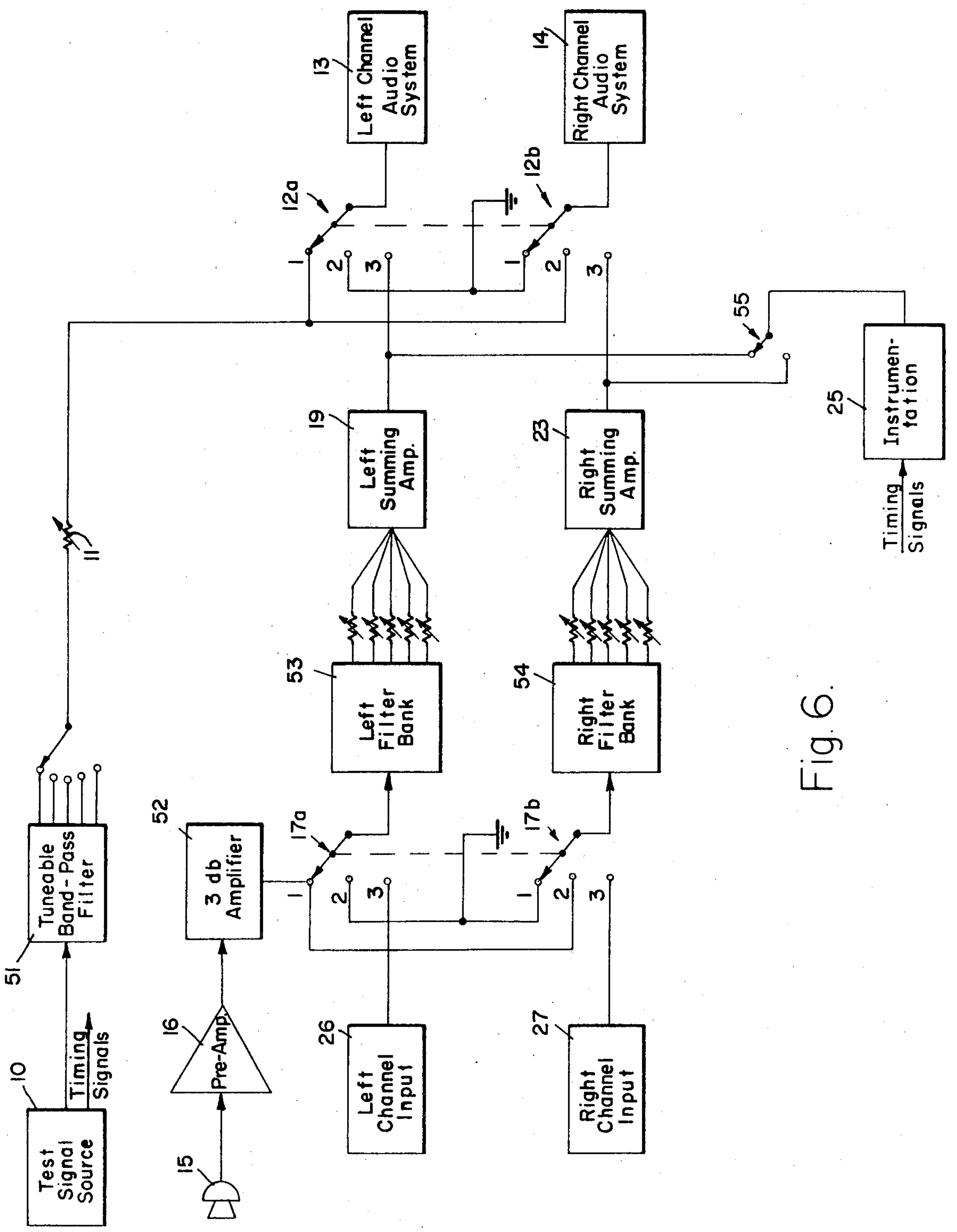
Figure 7:
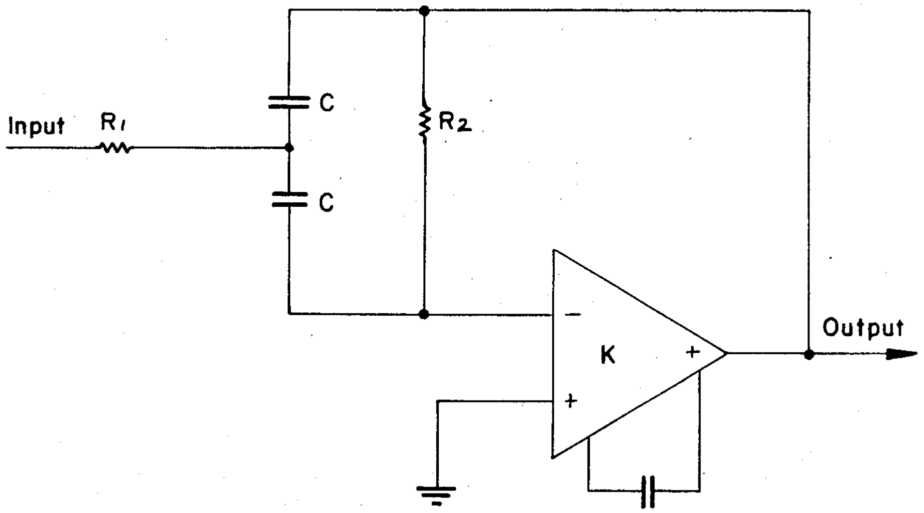
Figure 8:
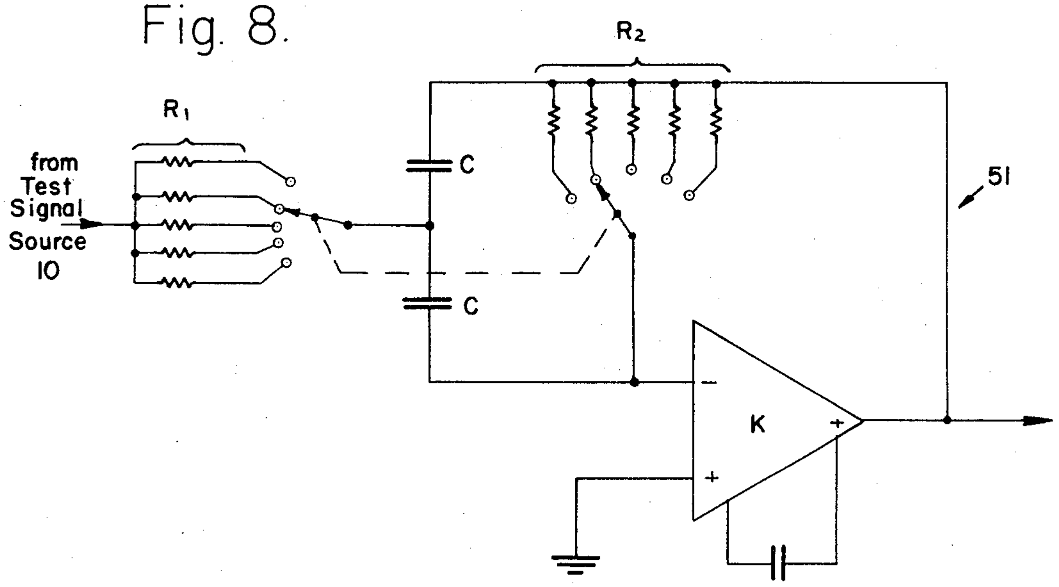

FIG. *5a–5f* is a series of seven waveforms which show how either a saw tooth or square wave can be used as the signal source;

FIG. 6 is a block diagram of a second embodiment for measuring the spectral power in the bandwidth of each of the filters in the filter bank;

FIG. 7 illustrates a schematic diagram showing an active filter including a bridge T with a peak response; and FIG. 8 illustrates a schematic diagram of a turnable bandpass filter of the same kind used in either the left or right filter banks.

Figure 1:
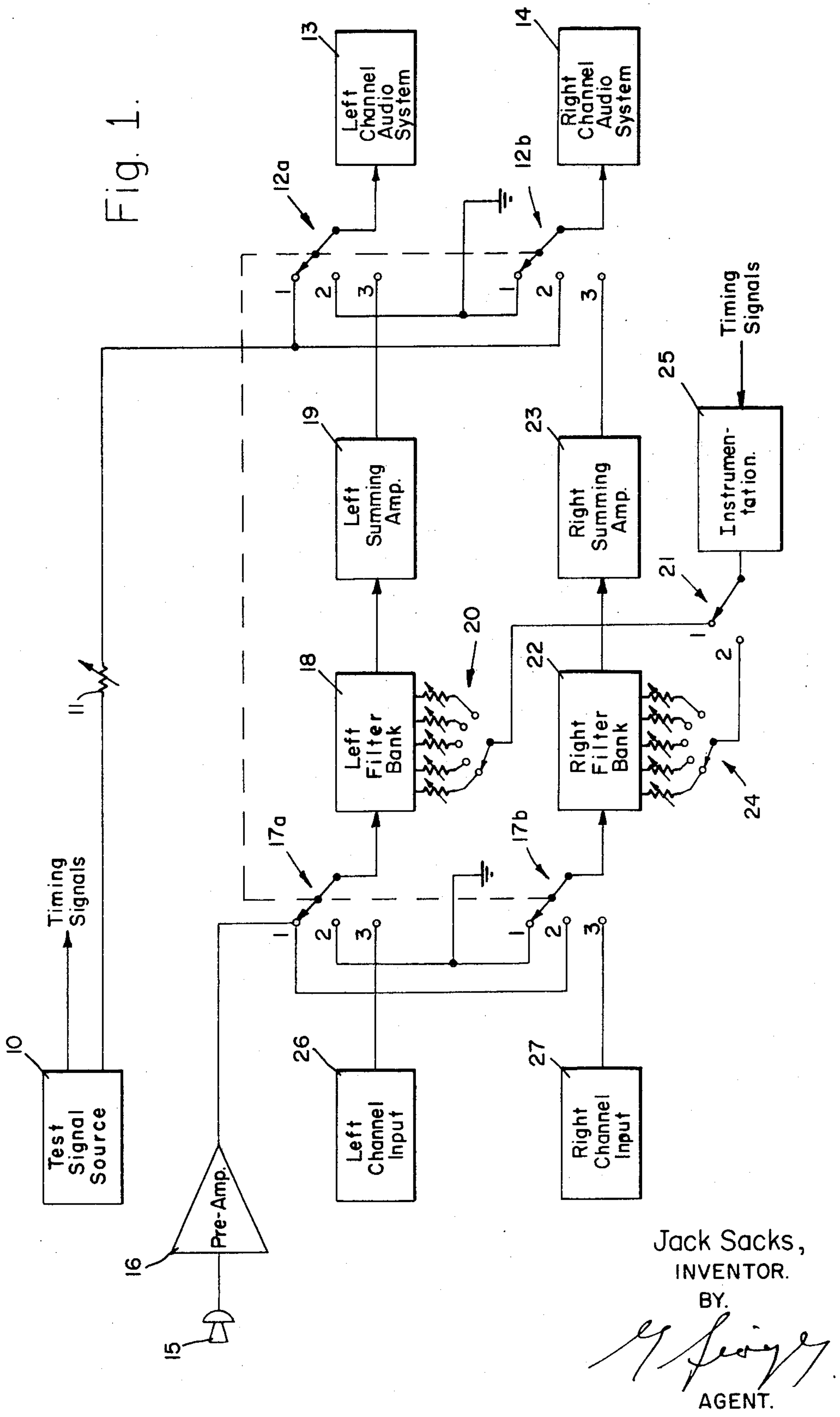
FIG. 1 is a block diagram illustrating a block diagram of the first embodiment showing the equalizer system for use with a complete two channel stereo system.

Referring now to FIG. 1, there is shown a block diagram illustrating a room equalizer with calibration for a complete two channel stereo system. A test signal source 10 generates the necessary timing signals and desired output waveform, which in the preferred embodiment is a square wave which is fed though a variable attenuator 11 to a switching network 12. The switching network **12*a* and 12*b* is adapted to select the output of the test signal source 10 for transmission through either a left channel audio system 13 for broadcast into the room or through the right channel audio system 14 for broadcast into the room. A substantially flat microphone 15 and preamplifier 16 detects the audio signal transmitted into the room and feed the detected signal to a switching network 17. With the switching network 17*a* in the first position the detected audio signal is fed to a left filter bank 18 which comprises a plurality of contiguous narrow bank filters which substantially cover the comb of spectral frequencies generated by the test signal source 10. The output of the left filter bank 18 is fed to a left summing amplifier 19 and then to the third position of the switching network 12***a*. The gain of each of the filters comprising the left bank 18 is separately adjustable and the outputs of each of said filters are fed together in the left summing amplifier 19. The outputs of each of said narrow bank filters are connected to a switch 20 which can individually select the output of each of the filters comprising the left filter bank 18. The output of switch 20 is fed to the first position of a switch 21.

In a similar manner the second position of switching network 17*b* can select the output of the preamplifier 16 for feeding a right filter bank 22 which comprises a similar number of contiguous narrow band filters which substantially cover the comb of spectral frequencies generated by the test signal source 10. The gain of the individual amplifiers comprising the right filter bank 22 are each separately adjustable and fed together to a right summing amplifier 23, the output of which is fed to a third position on switching network 12*b*. The output of each of the filters comprising the right filter bank 22 is separately connected to a rotating switch 24 which feeds the second position of switching network 21, which thereby allows switch 21 to select individual filters from either the left filter bank 18 or the individual filters from the right filter bank 22. The selected output from switching network 21 is fed to an instrumentation network 25 which detects and measures the spectral power in any of the selected filters.

A conventional left channel input 26 is connected to the third position switching network 17*a* and in a similar manner a conventional right channel input 27 is connected to the third position of switching network 17*b*.

During the calibration or equalizing mode of operation, the switching network 17 is placed in either the first position or second position for feeding the detected spectral frequencies to either the left filter bank 18 or the right filter bank 22.

The switching network 12 is preferably ganged together with switching network 17 so that whenever switching network 17 is in the first position, switching network 12 is also in the first position. Equalization of the left filter bank 18 will take place with the switching network 12 and 17 in position 1, and equalization of the right filter bank 22 will take place with the switching network in position 2. Normal or conventional operation of the stereo operation will take place when switching networks 12 and 17 are placed in the third position.

Figure 2:
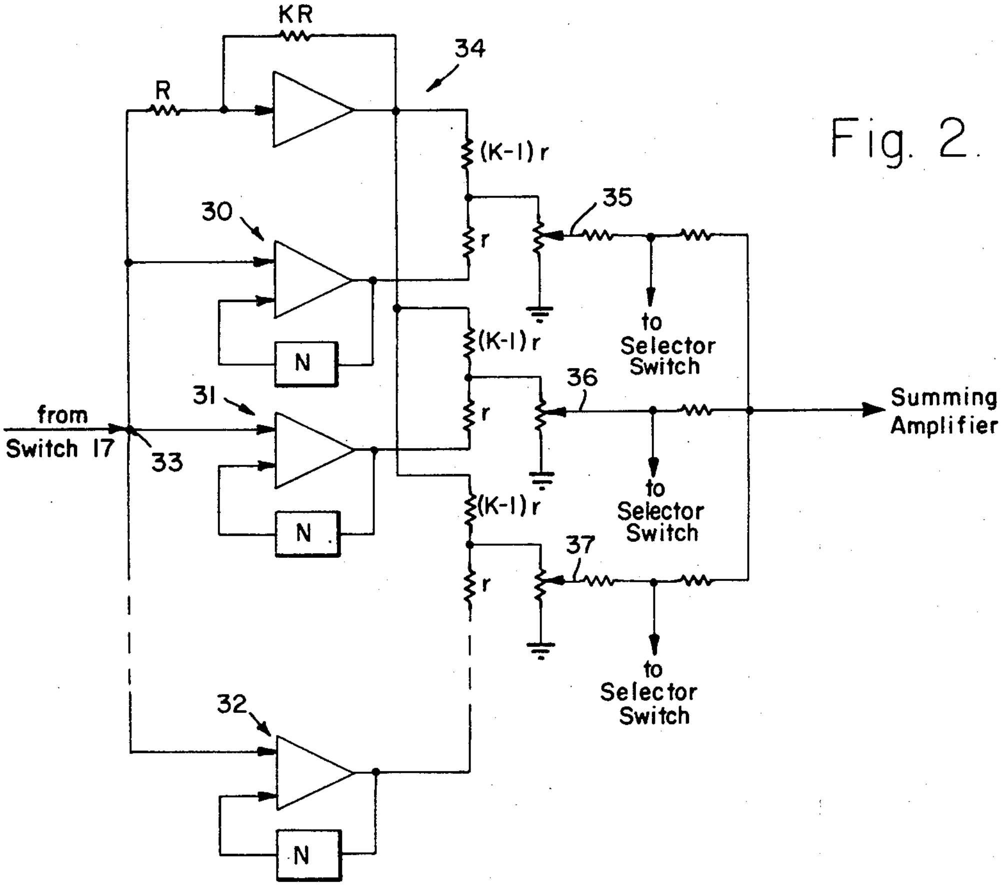
FIG. 2 is a block diagram illustrating a plurality of contiguous narrow band peakinG filters used to cover the desired audio band.

Referring now to FIG. 2, there is shown a partial block diagram of a bank of filters that could either represent the left filter bank 18 or the right filter bank 22 illustrated in FIG. 1. In the preferred embodiment, a plurality of substantially identical contiguous narrow band peaking filters 30, 31, and 32 have been used. The actual number of filters is a matter of design, however in the preferred embodiment 24 third octave filters have been proposed covering the range from 30 hertz to 15 KHZ. The input to all of the narrow band filters is a common input as at point 33. Since the gain of each of the filters used has a tail response which asymptotically approaches zero db, which is unity gain, an additional trail response cancellation amplifier 34 has been used to eliminate the tail response at unity gain and make the tail response of the amplifiers asymptotically approach zero gain. The gain output of each of the narrow band amplifiers 30, 31, and 32 is separately adjustable as at 35, 36, and 37.

The outputs from all of the individual narrow band filters are tied together and fed to a summing amplifier. The individual output representing the gain of each of the filters comprising the bank of filters is individually fed to a suitable switch position as shown in FIG. 1.

Figure 3:
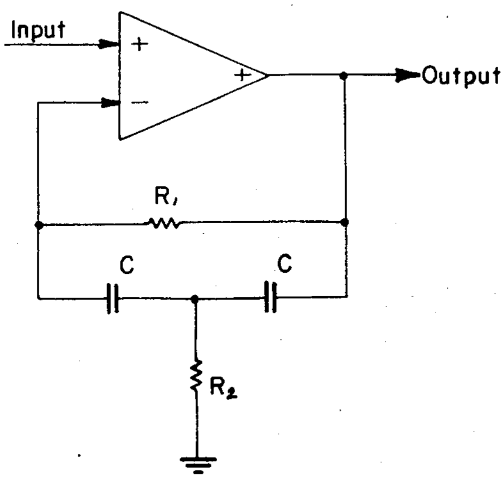
FIG. 3 illustrates another embodiment of a narrow band filter of the type known as a bridge T, null network in a feedback loop which has the desired response in which the tail response of the bandpass characteristic approaches zero gain.

FIG. 3 illustrates a narrow band filter having a bridge T in a feedback loop which gives a peak response and has the additional advantage of having a response curve in which the tail of the curve asymptotically approach zero gain.

It is possible therefore to construct a filter bank which consists essentially of a plurality of peaking filters as illustrated in FIG. 3. In other words, the left filter bank 18 and the right filter bank 22, illustrated in FIG. 1, would consist each of a plurality of filters as illustrated in FIG. 3.

Figure 4:
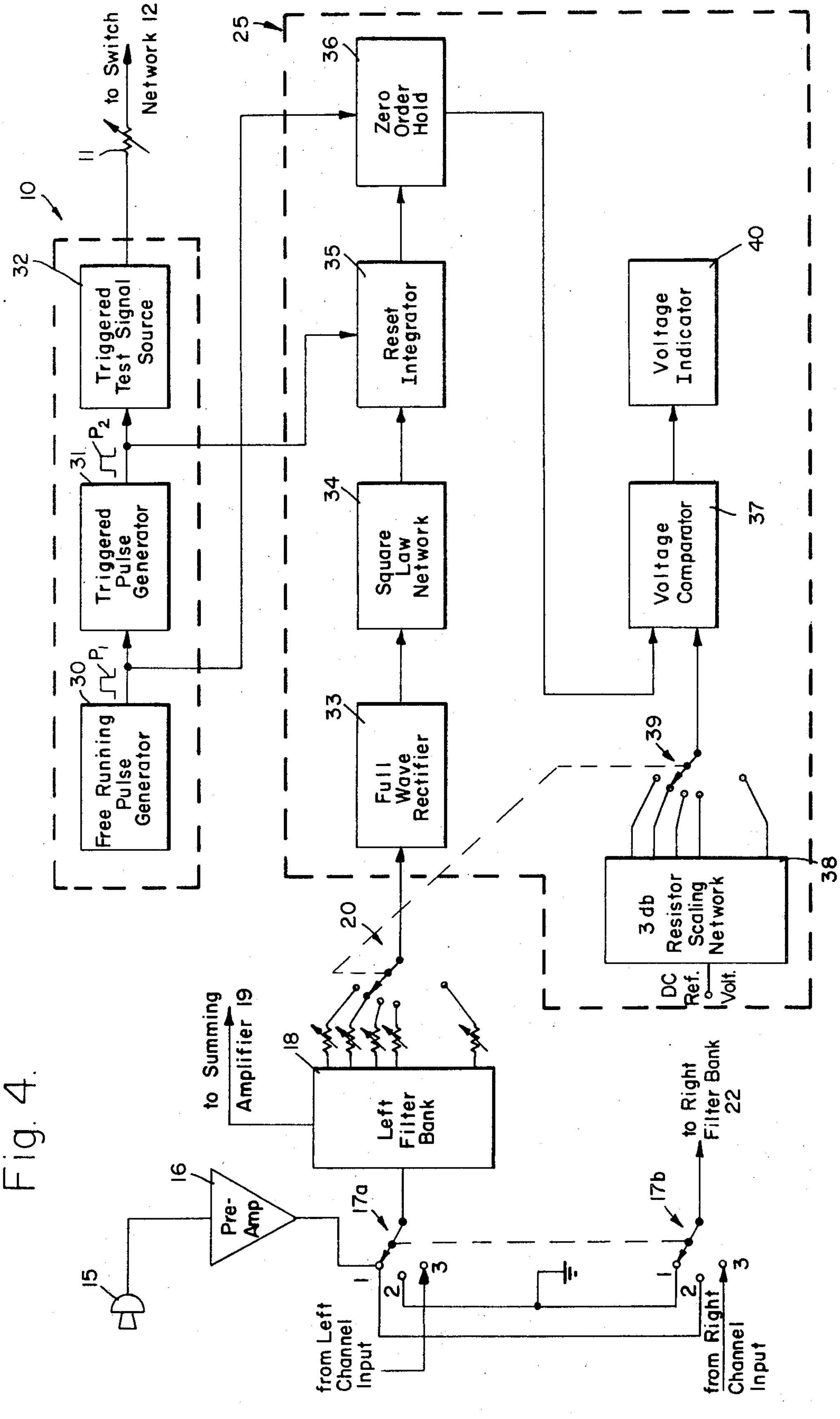
FIG. 4 is a more complete block diagram of the embodiment illustrated in FIG. 1 and which illustrates how the detected spectral power from the filter bank is processed and compared for adjusting each of the filters in the filter bank.

Referring now to FIG. 4, there is shown a more complete block diagram of the system illustrated in FIG. 1 and which specifically details the generation of the test signal source and the means for detecting the spectral power in each of the narrow band contiguous filters comprising each of the defined filter banks. The description of FIG. 4 will follow the description of FIG. 1 and will use similar numbers for those items describing similar parts and performing similar functions.

Figures 5A, 5B, 5C, 5D, 5E, 5F:
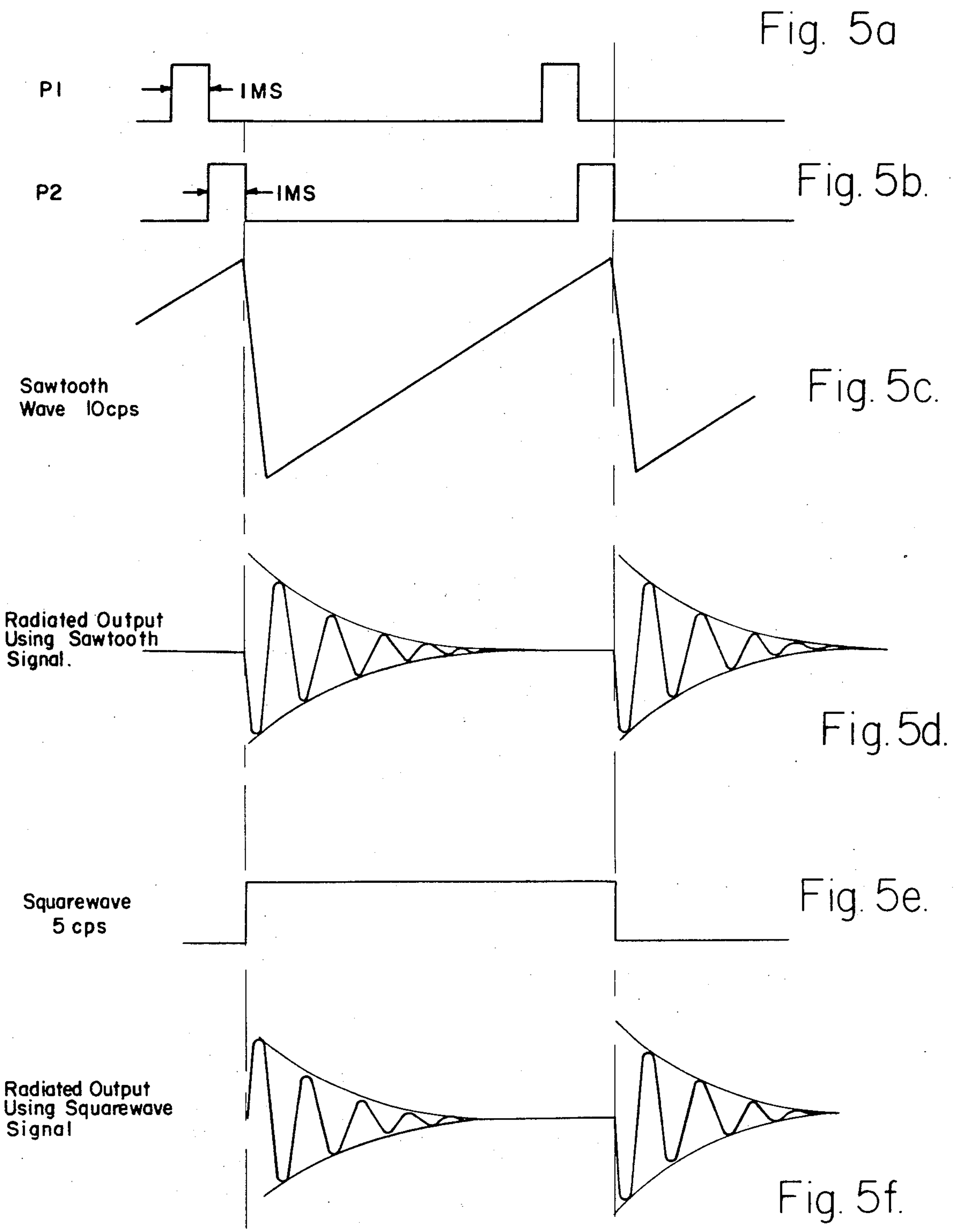

The test signal source 10 comprises a free running pulse generator 30 which generates a pulse P1, which is more fully illustrated in FIG. 5. The output of the free running pulse generator 30 triggers a triggered pulse generator 31 which generates an output pulse P2, more fully illustrated in FIG. 5. As shown in FIG. 5, the trailing edge of pulse P1 triggers the triggered pulse generator 31, which generates pulse P2. Since the pulse generator 31 must be triggered by the trailing edge of P1, the output pulse P2 is locked to the trailing edge of the pulse generated by free running pulse generator 30. Pulses P1 and P2 are the timing signals illustrated in FIG. 1 as being fed from the test signal source 10 to the instrumentation 25.

The output of the triggered pulse generator 31 is P2 which is used to trigger the triggered test signal source 32 which may be either a saw tooth generator or a square wave generator. The relationship between the saw tooth wave generated by the triggered test signal source 32 is more fully shown in FIG. 5, which in the preferred embodiment had a repetition rate of 10 hertz per second. The saw tooth wave however does have a defect which in that the retraces are all in the same direction. The output of the saw tooth wave generated by the triggered test signal source 32 is fed through either the left channel audio system 13 or the right channel audio system 14, as illustrated in FIG. 1. The saw tooth wave will therefore pass through a high pass filter comprising the tweeter of the audio system generating the sound. The crossover network is a filter having a high pass characteristic that passes a high frequency as a plurality of unidirectional spikes. When these unidirectional spikes are passed through an AC coupled system, the average value of the voltage on both sides of the capacitor will become zero. Since the change on both sides of the capacitor comprising the AC coupled amplifier is equal, it follows that only one half of the dynamic range of the amplifier is being used, or in other words the amplifier is peak-amplitude limited.

On the other hand, by using a square wave of the type shown in FIG. 5, which has a repetition rate of, for example, 5 hertz per second the trailing edge of the P2 pulse triggers the wave generated by the triggered test signal source 32, be it a square wave or a saw tooth wave. By using a 5 hertz per second square wave generator as the trigger test signal source being generated by 32, a sign reversal of the output comb of frequency is generated due to the positive-going square wave in the first instance and the negative-going square wave in the second instance, as shown in FIG. 5. This has the effect of utilizing the full dynamic range of the amplifier and hence the amplifier is not peak amplitude limited, as would be the case with the saw tooth wave. In view of the overall operation of the system, either the saw tooth or the square wave may be used.

The output of the triggered test signal source 32 is fed to the selected audio system which broadcasts the comb of frequencies into the room. Assuming that the switching network 12, illustrated in FIG. 1, is set in the first position, it will be noted that the left channel audio system 13 will be connected to the output of the trigger test signal source 32 through the variable potentiometer 11 and that a comb of frequencies will therefore be broadcast into the room environment.

Microphone 15 will detet the comb of frequencies and in combination with the preamplifier 16 will feed the detected signal through switching network 17*a*, as set in the first position to the left channel to be equalized. The switching network 12, illustrated in FIG. 1, is also ganged with switching network 17 so that whenever the left channel audio amplifier system 13 is broadcasting, then switching network 17 will be in the first position for equalizing the left filter bank 18. The detected output will therefore be fed to the left filter bank 18, the output of which will be fed to the left summing amplifier 19, as shOwn in FIG. 1.

The outputs of the individual narrow band contiguous filters comprising the left filter bank 18 are also fed to switching nework 20 which is capable of selecting the output of each of the filters and individually feeding the output of these filters to a full wave rectifier 33. The output of the full wave rectifier 33 is fed to a square law network 34, which converts the amplitude dependent output from the full wave rectifier 33 to a signal which is representative of the power contained in the output of the full wave rectifier. In other words, the output of the square law network 34 will be a signal representative of power contained in the bandwidth of the selected narrow band filter of the left filter bank 18 and will therefore be independent of the envelope or amplitude variations of the signal appearing in the bandwidth of the selected filter. The square law detector 34 feeds a reset integrator 35 which in turn feeds a zero order hold circuit 36. The zero order hold circuit 36 is sampled by the P1 pulse generated by the free runing pulse generator 30. The actual sampling time is determined by the width of the P1 pulse, which in the preferred embodiment is 1 millisecond wide. The reset integrator 35 is reset and cleared by the P2 pulse which is generated by the trailing edge of the P1 pulse. In time sequence the zero order hold circuit 36 samples the circuit from the reset integrator 35 which is then sequentially reset for the next sampling period resulting from the main bang being generated by the triggered test signal source 32, which signal is then again generated by the audio sound system into the environment for detection by the microphone 15.

The output of the zero order hold circuit 36 is fed to a voltage comparator 37 which also receives a scaled reference voltage from a 3db per section scaling network 38 through a switching network 39 which is ganged to switching network 20. The function of the 3db scaling network 38 will be more fully described in reviewing the operation of equalizing the room to the audio generating system. The voltage comparator 37 will compare the detected voltage from the zero order hold circuit 36 to the scale-down reference signal from the 3db scaling network 38 and feed the output to a voltage indicator 40.

In the preferred embodiment each of the filters comprising the filter banks have equal Q which means the bandwidth is proportional to the center frequency. Since the bank of filters are all set up for flat response, it can be shown that the bandwidth at the lower frequencies for each of the filters of equal Q will contain a less amount of spectral power than the bandwidth at the higher frequencies. A review of the mathematics will show that as the frequency increases that the increase of spectral power in the bandwidth of the higher order filters will increase at a 3db per octave rate.

However, whenever a square wave is used for the trigger test signal source 32 a Fourier analysis of the square wave will show that the amplitudes of the odd harmonics comprising the square wave decreases as the order of the harmonic increases. In the example given where a 5 hertz per second square wave is generated by the trigger test signal source 32, we can show a fundamental signal at 5 hertz per second with a corresponding spectral signal every 10 hertz. In other words, the third harmonic will appear at 15 hertz having an amplitude of one-third the fundamental and the fifth harmonic will appear at 25 hertz having an amplitude of one-fifth the harmonic and similarly with the seventh harmonic appearing at 35 hertz having an amplitude of one-seventh the harmonic and similarly with all other odd harmonics. This exponential decay from the fundamental can be shown to approximate a 20db per decade or 6db roll off per octave as the frequences increases.

In a similar fashion the 10 hertz saw tooth wave can be shown to have a fundamental at 10 hertz and a second harmonic at 20 hertz, having an amplitude of one half the fundamental and a third harmonic at 30 hertz with an amplitude of one third the fundamental and a fourth harmonic at 40 hertz with an amplitude of one-fourth the harmonic, and similarly as the harmonics increase. This exponential decay can similarly be shown to follow a 20db per decade roll off or a 6 db per octave roll off as the frequency increases to the nth harominc. A review of FIG. 4 will show that since the filter banks 18 and 22 are preferably using equal Q filters that as a result there is a 3db per octave gain in spectral power and coupled with the roll off of 6db per octave caused by the transmitted square wave or transmitted saw tooth wave from the triggered test signal source 32. It can now be seen that the resultant roll off from the low to the high frequencies will be a resultant 3db per octave. The 3db scaling network 28 is nothing more than a reference DC voltage having a separate tap for each of the filters comprising the filter bank and which taps define a voltage which varies from the high to low end at a 3db tap change.

The procedure for equalizing the audio system to the environment requires the switching network 17 and 12 to be set in the first position which will place the left channel audio system 13 on the line. The output from the trigger test signal source 32 will then be transmitted through the left channel audio system 13 and will be detected by the microphone 15 and fed through the left filter bank 18. Switching network 20 is then placed on the 1 kilocycle filter since it is generally conceded to be in the geometric center of the audio band as defined by 20 hertz to 20 KHZ. With switching network 20 on the 1 KHZ filter terminal switching network 39 will be set at the middle of the range of the resistor network comprising the 3db voltage swing from the 3db scaling network 38. At this point the system is normalized by adjusting the variable attenuator 11 which controls the volume output from the triggered test signal sOurce 32, which in turn controls the amount of power being generated by the system and detected by the microphone 15. The variable attenuator 11 is adjusted until the voltage indicator 40 is equal to the middle range on the tap selected by switch 39 and as measured by voltage indicator 40. Once the system is equalized to the center frequency of 1 KHZ, the switching network 20 is adjusted to the highest frequency filter used in the system and since switch 39 is ganged to switch 20, the proper voltage representing the 3db scaling network will be selected. The operator then adjusts the gain control on the selected filter for a proper indication on the voltage indicator 40. The voltage indicator 40 may either consist of light indications indicating high and low or a voltage indication with suitable indications or indicia on the voltage scale. Each of the filters is then adjusted in turn by selecting switch 20 and adjusting the gain on the individual filter for the proper null as indicated by the output of the voltage comparator 37 to the voltage indicator 40.

Referring now to FIG. 6 there is shown another embodiment of the invention similar in function to that shown in FIG. 1 but implemented in a different manner. Practical experience has shown that the Q of the tuned circuits comprising the individual filters of either the left filter bank or the right filter bank should be selected so as to provide a substantially flat spectrum having a ripple in amplitude not exceeding 1db. This requirement does not affect the criticality of the invention but only affects the practicalities since the effect is to reduce the interaction of the tails of the response curves comprising the individual filters. In the system described in FIG. 1, it is possible by removing a filter to obtain at least a 6db notch, whereas peaking an individual filter can achieve at least an 8 to 10db gain to thereby compensate for the anomalies between the amplifier system and the room environment. In using the system described in FIG. 1 and attempting to correct for a large variation in the transfer function between the speaker system and the room environment, it was discovered that the total correction available by adjusting the individual filters was limited by the overlapping of the skirts of the tuned circuit responses of all other filters on each side of the filter being adjusted. In other words, in attempting to correct for a 6db correction in a given filter it was found that due to the oVerlapping skirts of the responses of all other filters that the overall correction actually achieved was only 3db and that since the system of FIG. 1 only looked at the spectral power in a given filter that it was impossible to correct or adjust for the interaction caused by the skirts of the other filters. It is recognized, of course, that the Q of the filters could be peaked up and made sharper and thereby remove the effect of the overlapping skirts; however such an effect is undesirable because the transient response becomes very critical and hence undesirable.

In the system illustrated in FIG. 6 the instrumentation network looks at the total output of first the left filter bank and then the right filter bank. The output pulse from the test signal source 10 is modified by a single, tunable bandpass filter of the same kind as used in either the left filter bank or the right filter bank. In this manner, a single spectral envelope of power is transmitted at a given frequency. The detected signal is fed through a similar filter in the filter bank that is tuned to the same frequency as the transmitted signal and hence the spectral power passed by the filter bank is tuned to the same frequency being transmitted and be passed to the summing amplifier. At the same time, power from the other filters caused by the overlapping skirts of the tuned networks will also be passed to the summing amplifier. The instrumentation by looking at the output of the summing amplifier will then observe the power being passed not only by the filter that is under observation and being tuned, but also the effect of the skirts of all other filters and hence the effect of the skirts can now be observed and corrected by a minimum number of repeat operations.

The basic operation of the system illustrated in FIG. 6 is the same as that disclosed in FIG. 1 and hence wherever similar items are used, the same number will be applied. Referring now to FIG. 6, there is shown a test signal source 10 which may either generate a square wave or sav tooth or any other wave as previously described. The output of the test signal source 10 is fed to a single tunable bandpass filter 51 which is basically identical to the filter used in either the left filter bank or the right filter bank but which is made tunable and in which the Q is independent of frequency. FIG. 7 illustrates an active filter including a bridge T which may be used in either of the left or the right filter banks. FIG. 7 illustrates a tunable bandpass filter which is simply a modification of the active filter illustrated in FIG. 8. The two switches are ganged together and the number of switch positions would equal the number of filters used in either of the left filter bank or the right filter bank, and hence the total number of positions is a function of design only.

The tunable bandpass filter 51 thereby filters the wave being generated by the test signal source 10. The output of the tunable bandpass filter 51 is fed to an attenuator 11 having the same function and purpose as that described in FIG. 1. The output of the tunable bandpass filter 51 will therefore be a plurality of pings which will occur at the break point of the square wave and which will vary in phase depending on whether the break is positive going or negative going, as shown in FIG. 5. The signal source fed through the switching network 12 to either the left channel 13 or the right channel 14 for broadcast into the environment will then be the pings emanating from the tunable bandpass filter 51. In other words, assuming a square wave generator, the test signal source 10 will generate the comb of frequencies whereas the tunable bandpass filter 51 will select the frequency band of filters which, for example, may be set at 1,000 hertz and hence a comb of frequencies around 1,000 hertz will be transmitted into the room environment. The selected comb of frequencies will be received by the microphone 15 fed to the preamplifier 16 and then to a 3db per octave amplifier 52 before being selected by the switching network 17 for transmission to either the left filter bank 53 or the right filter bank 54. The 3db octave amplifier 52 may be located anywhere in either the broadcasting chain or in the microphone chain since it is needed to achieve a flat response frOm the filter banks. The individual filter banks have been given new identification numbers since they are modified to the extent that each of the individual narrow band filters are no longer sampled as described in FIG. 1 but rather all of the outputs, which are still individually gain adjustable, are fed together. The output of the left filter bank 53 is summed in a left summing amplifier 19 whereas the bank of filters for the right filter bank 54 are fed to the right summing amplifier 23. The output of the left summing amplifier 19 is fed to the third position of the switching network 12*a* as previously described and in a similar manner the output of the right summing amplifier 23 is fed to the third position of switching network 12 for transmission by the right channel audio system as previously described. However, the output of the left summing amplifier 19 and the output of the right summing amplifier 23 are fed to a switching network 55 which may select either output for transmission to an instrumentation network 25 of the same type as described in connection with FIG. 1.

The function of switching network 55 is to select the output of the total or composite output of either the left summing amplifier 19 or the right summing amplifier 23. For example, if the tunable bandpass filter 51 is set for a 1 KHZ filter, then a comb of frequencies about 1 KHZ is transmitted into the room by the left channel audio system 13 and detected by the microphone 15 and preamplifier 16 and eventually fed through the left filter bank 53 to the left summing amplifier 19. The composite output at the left summing amplifier 19 will not only contain the bandpass characteristic of the 1 KHZ filter in the left filter bank 53, but also the effect of all of the overlapping skirts of all other filters which may have some remote affect on the 1 KHZ spectral frequencies being observed at the output of the left summing amplifier. The attenuator 11 is adjusted in the same fashion as that described in connection with FIG. 1 to obtain a null or predefined voltage readout from the instrumentation network 25. Once the system is thus normalized, the tunable bandpass filter is then set on the highest frequency of the filter used and similar adjustments for the instrumentation network 25 are made in the same fashion as described previously.

The interaction of the skirts of adjacent filters will result inapproximately three and maybe four reiterations of adjustments before a flat bandpass characteristic from the left filter bank 53 is obtained. After the left filter bank 53 is adjusted, switching network 17 and seitching network 12 is adjusted for right channel operation and the same procedure is again repreated until all the filters in the right filter bank 54 have been adjusted for a flat response. Upon the completion of adjusting both the left filter bank 53 and the right filter bank 54, switching networks 17 and 12 are placed in the third position which provide the system for normal operation of the left channel input 26 and the right channel input 27 through their appropriate filter banks to their associated left channel audio system 13 and right channel audio system 14 for normalized operation.

In the preferred operation of the invention, it was mentioned that equal Q coils for all the left filter bank filters and the right filter bank filters have been proposed. Because of the equal Q there is a resultant 3db octave boost in power as the frequency is increased, since the power increases directly as frequency increases and hence the spectral power in the bandwidth of any filter will increase at a 3db octave rate as the frequency increases. As described previously, the use of either the square wave or the saw tooth wave as the test signal source will result in a 6db per octave slope as frequency increases, or in other words the resultant change from the low to the high frequency will be a 3db per octave resultant roll off. This 3db per octave roll off was originally compensated for by the instrumentation network 25 illustrated in FIG. 1 and in FIG. 6. and specifically by the 3db scaling network 38 illustrated in FIG. 4.

In connection with FIG. 6, however, it was soon recognized that the skirts of the individual filters comprising the left filter bank and the right filter bank had a transfer function which approached the same characteristics as a tuned circuit response. In other words, the skirts of the filters representing the overlapping portion of the transfer function of each of the filters approached a 6db per octave roll off on each side of the center frequency that the tunable andpass filter 51 is tuned to. When considering either a square wave or a saw tooth wave as the test signal source the spectral power rolls off at a 6db per octave rate as the frequency varies from the low end to the high end of the band. When considering the spectral power of any individual filter and specifically at the skirts of the filter, we can see that with the band rolling off at a minus 6db octave rate and with the skirts at the low end of the filter rolling off at a plus 6db per octave rate, that the resultant roll off at the low end approaches a flat or zero roll off. When considering the skirt at the high end of the transfer function of the bandpass filter, we compare a plus 6db per octave roll off for the skirt against a plus 6db per octave roll off for the square wave spectral power, we have a resultant 12db octave roll off at the high end of the skirt of the transfer function of the individual filter. This different effect of the zero roll off at the low end and 12db per octave roll off at the high end for the skirts of the individual filter means that more spectral power will be received by the skirt at the low end of each of the filters since power is a function of the square of the amplitude of the incoming voltage and the voltage is coming in at full amplitude. At the high end the skirts are rolling off the power at a 12db octave rate, which means that the voltage of the spectral power at the higher frequencies under the skirts of the individual filters will be rolling off at a 12db per octave rate. In other words, the individual fitler will be passing more spectral power at the skirts of the low end than at the skirts of the higher end which will unduly effect the weighting power of the low frequencies end. The overall effect is too lower the low frequency power and increase the high frequency power which is undesirable.

This effect is compensated for by adding a 3db per octave positive slope to the network which is shown as the 3db per octave amplifier 52 in FIG. 6. By increasing the 6db per octave slope of the overall spectrum to a 3db per octave resultant slope by the addition of the 3db per octave amplifier 52, a similar review of the bandpass characteristic of the skirts of the individual filter will now show that at the low end there is a resultant 3db per octave roll off whereas at the high end there is now only a 9db per octave roll off. A review of the mathematics will now show a substantially equal power under the skirts at the low end and that under the high end of the filter. That completes the description of the preferred embodiments of the present invention. Many modifications may be made by those persons skilled in the art without departing from the spirit and scope of the present invention. For example, in FIG. 6 the location of the 3db per octave amplifier 52 can be located either in the transmitting chain after the tunable bandpass filter 51 or any place in the microphone chain feeding the left filter bank and the right filter bank.

What is claimed is:

1. A system for equalizing an audio sound transducer system with an environment adapted to receive the sound generated by said sound system comprising, means for generating a signal source comprising a comb of spectral frequencies in the audio range, means for feeding said comb of frequencies into the audio sound transducer system for broadcast into the environment, a plurality of contiguous narrow band filters substantially covering the band of said comb of spectral frequencies, means for detecting and feeding said comb of sPectral frequencies through said plurality of narnow band filters, means for measuring the spectral power in the bandwidth of at least one of said filters, and means for comparing and controlling the power output of the filter against a known reference.

2. A system according to claim 1 in which said signal source is a square wave and said comb of frequencies are representative of the odd harmonics comprising said square wave.

3. A system according to claim 1 in which said narrow band filters are all peaking filters each having a separate gain control for individually controlling the gain of each peaking filter.

4. A system according to claim 3 in whith said filters each comprise a bridge T null network in a feedback loop for giving a peak response.

5. A system according to claim 1 in which all of said filters have equal Q.

6. A system according to claim 3 in which said peaking filters have inputs and outputs all connected in parallel, the outputs of said filters being summed together in a single summing amplifier.

7. A system for equalizing an audio sound transducer system with an environment adapted to receive the sound generated by said sound system comprising, meanS for generating a signal source comprising a comb of spectral frequencies in the audio range, means for feeding said comb of frequencies into the audio sound tranSducer system for broad ast into the environment, a plurality of contiguous narrow band filters substantailly covering the band of said comb of spectral frequencies, means for detecting and feeding said comb of spectral frequencies through said plurality of narrow band filters, means for measuring the spectral power in the bandwidth of at least one of said filters and deriving a voltage as a function of the measured power, and means for comparing the derived voltage againSt a known voltage reference.

8. A system according to claim 7 which includes separate means for controlling the gain of each filter whereby the derived voltage from each filter is equal to said known voltage reference.

9. A system according to claim 7 which includes a rectifier for rectifying the complex waveform output of each filter, a square law network for connecting the rectified output into a signal indicative of power whereby the output is independent of waveform amplitude, and means for integrating the output of said square low network whereby a voltage is produced which is a function of the spectral power in the bandwidth of said filter.

10. A system for equalizing an audio sound transducer system with an environment adapted to receive the sound generated by said sOund system comprising, means forgenerating a signal source comprising a comb of spectral frequencies in the audio range, means for filtering said generated comb of spectral frequencies with a tunable bandpass filter having a given bandpass transfer function, means for feeding said filtered comb of frequencies into the audio sound transducer system for broadcast into the environment, a generated band of contiguous narrow band peaking filters substantially covering the band of said comb of spectral frequencies, means for detecting and feeding said filtered comb of spectral frequencies through said plurality of narrow band filters, meanS for measuring the total spectral power in the output of the plurality of said filters, and means for controlling the power output of the peaking filter in said bank of filters having the same bandpass transfer function used to filter the transmitted signal.

11. A system according to claim 10 in which said means for filtering said generated comb of spectral frequencies is a tunable bandpass filter having the same Q and bandpass characteristics as each of said filters in said bank of filters.

12. A method of equalizing a room environment with an audio sound generating system that comprises the steps of first generating a signal source comprising a comb of spectral frequencies in the audio range, then filtering said generated comb of spectral frequencies with a bandpass filter having a given bandpass transfer function, then broadcasting said filtered signal through the audio sound generating system, then detecting and feeding said detected signal through a bank of a narrowband peaking filters each having substantially the same transfer function as the filter used to filter the original signal source, then measuring the total spectral power in the combined output of the bank of filters, then adjusting the gain of the filter in the bank of filters that is the same as the filter used to filter the original signal source, then tuning the bandpass filter to a new bandpass frequency and adjusting the gain of the filter in the bank of filters having the same corresponding bandpass frequency, and then repeating the process until the total spectral power is substantially flat.

13. A sound measuring system comprising:

means for generating a signal source comprising a comb of spectral frequencies in the audio range, means for feeding said comb of frequencies into an audio sound transducer system for broadcast into surrounding environment, means for detecting and feeding said received comb of spectral frequencies through a tunable bandpass filter having a given bandpass transfer function, and means for measuring the total spectral power in the output of said tunable bandpass filter.

14. A sound measuring system comprising:

meanS for generating a signal source comprising a comb of spectral frequencies in the audio range, means for feeding said comb of frequencies into an audio sound transducer system for broadcast into the surrounding environment;

a plurality of filters substantially covering the band of said comb of spectral frequencies, means for detecting and feeding said received comb of spectral frequencies through said plurality of filters, and means for measuring the spectral power in the output of said filters.

* * * * *